United States Patent [19]

Hostetler et al.

[11] Patent Number: 4,589,373
[45] Date of Patent: May 20, 1986

[54] WATERING DEVICE FOR FOWL AND SMALL ANIMALS

[75] Inventors: Eldon Hostetler; Robert D. Hostetler, both of Middlebury, Ind.

[73] Assignee: Ziggity Systems, Inc., Middlebury, Ind.

[21] Appl. No.: 631,623

[22] Filed: Jul. 16, 1984

[51] Int. Cl.⁴ .................. A01K 7/06; A01K 39/02
[52] U.S. Cl. ....................... 119/72.5; 119/75
[58] Field of Search .............. 119/72.5, 75; 251/339, 251/367

[56] References Cited

U.S. PATENT DOCUMENTS

| | | | |
|---|---|---|---|
| 1,902,919 | 3/1933 | Talbot | 251/339 X |
| 3,385,267 | 5/1968 | Boegli et al. | 119/72.5 |
| 3,416,499 | 12/1968 | Wilmot | 119/72.5 |
| 3,527,193 | 9/1970 | Smith | 119/72.5 |
| 3,550,560 | 12/1970 | Edstrom | 119/72.5 |
| 3,566,844 | 3/1971 | Occhiodori | 119/72.5 |
| 3,602,197 | 8/1971 | Fioretto | 119/72.5 |
| 4,047,503 | 9/1977 | Wilmot | 119/75 |
| 4,282,831 | 8/1981 | Nilsen | 119/75 |
| 4,284,036 | 8/1981 | Hostetler | 119/72.5 |
| 4,338,884 | 7/1982 | Atchley et al. | 119/75 X |
| 4,444,149 | 4/1984 | Shomer | 119/18 |

Primary Examiner—Robert P. Swiatek
Attorney, Agent, or Firm—Barnes & Thornburg

[57] ABSTRACT

A watering device for fowl and small animals having a two-part telescopically interfitting housing and interlocking hooks on the housing parts which are provided with elements to accommodate interlock and release thereof by relative rotation of the housing parts when telescoped. The interlock hooks releasably resisting relative rotation of housing parts when the interlock hooks are operatively engaged. One housing part has a projecting externally screw threaded inlet tube for sealing threaded fit and anchorage in an aperture of a water supply conduit.

4 Claims, 8 Drawing Figures

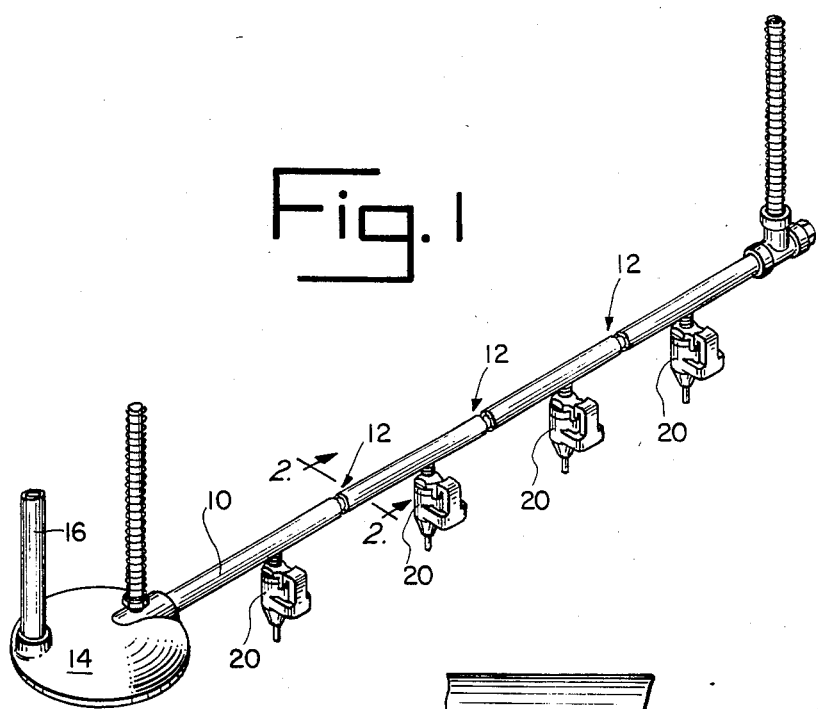
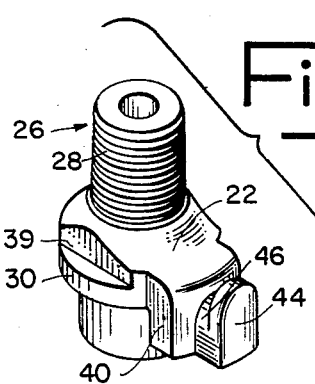
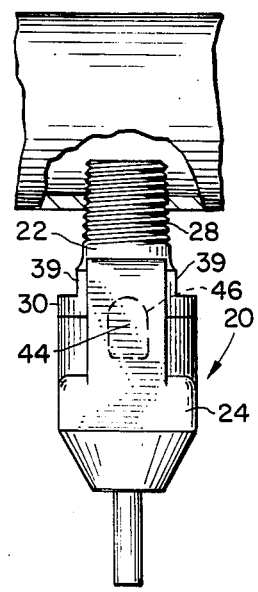
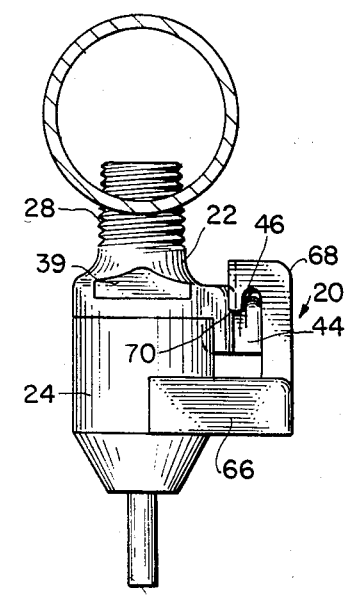
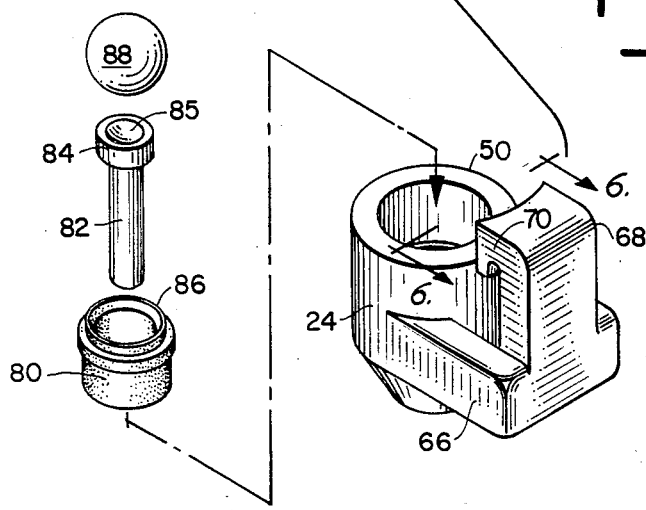

WATERING DEVICE FOR FOWL AND SMALL ANIMALS

SUMMARY OF THE INVENTION

Various types of watering devices for fowl and small animals have been developed previously. These devices usually have been of the type by which the fowl and small animals may easily and conveniently operate a valve from a water supply line and have been of the type which automatically seal to prevent leakage at the device after the valve has intentionally been operated to secure drinking water. Prior devices have commonly had disadvantages such as high cost, difficulty of installation, complicated constituent parts, and requirement for special auxiliary equipment to permit installation thereof.

This device has been conceived and designed to utilize the advantages of prior devices such as disclosed in U.S. Pat. No. 4,284,036, dated Aug. 18, 1981 and to eliminate the need for auxiliary parts and equipment required for such prior devices.

One object of this invention is to provide a simple, inexpensive construction of light weight and small size which can easily be installed in conjunction with a water supply line adjacent to a cage.

Another object is to provide a device which can be installed at any selected point on a water line adjacent a cage by means of a tapered screw threaded integral mounting member which provides a seal-forming connection with the water line.

A further object is to provide a device having a firm but detachable connection of telescopically interfitting parts thereof without the use of supplemental securing means and by the use of simple interconnecting means between constituent parts thereof.

Other objects will be apparent from the following specifications.

BRIEF DESCRIPTION OF THE DRAWINGS

FIG. 1 is a perspective view illustrating a mounting of a group of valve devices upon a water supply line.

FIG. 2 is a transverse sectional view taken along line 2—2 of FIG. 1 illustrating the connection of a device to a water supply line.

FIG. 3 is a view of the device taken at right angles to the position of the parts shown in FIG. 2.

FIG. 4 is an exploded view illustrating the component parts of my improved device.

DESCRIPTION OF THE PREFERRED EMBODIMENT

Figure 5:
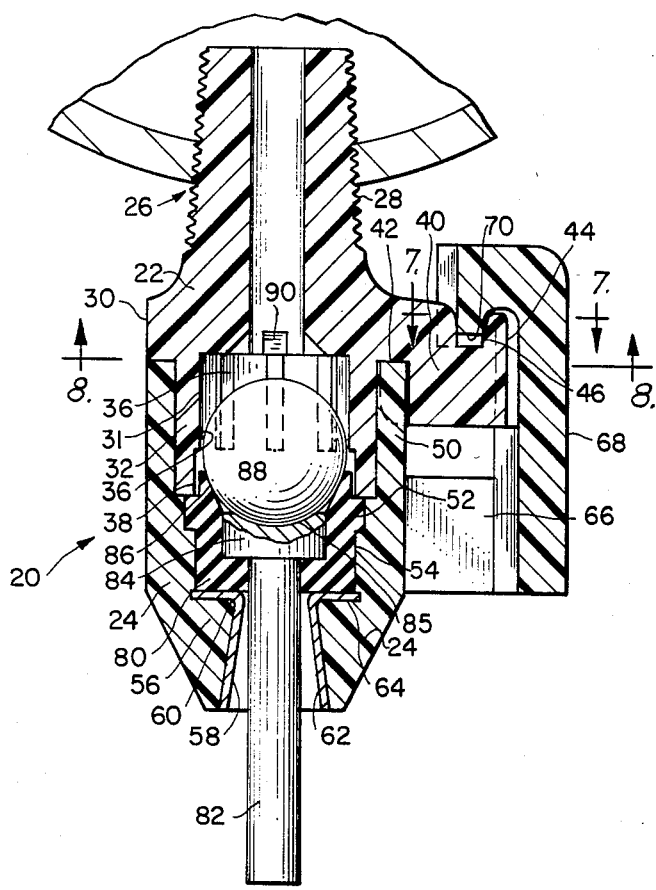
FIG. 5 is an enlarged axial sectional view of the device as installed in the water line in assembled condition.
Figure 7:
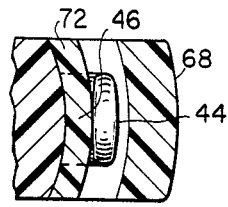
FIG. 7 is a fragmentary sectional view taken along line 7—7 of FIG. 5.

Referring to the drawings which illustrate the preferred embodiment of the invention, the numeral 10 designates a water supply line or conduit suitably supported at 12 to position the conduit 10 alongside of a group of cages within which fowl and small animals are confined. The water supply unit preferably includes a regulator 14 supplied from a conduit 16 extending to a source of water under pressure.

Each of a plurality of watering devices 20 is positioned to be accessible to the occupants of individual adjacent cages. (not shown) Each watering device 20 includes cooperating housing parts 22 and 24. The housing parts 22 and 24 are preferably molded from a plastic material of suitable rigidity.

Housing part 22 includes a tubular slightly tapered neck portion 26 which is externally screw threaded at 28 which may be anchored to supply conduit 10, also preferably of plastic tubing, at an opening in the tube 10 formed at any selected location along the tube 10. The tapered screw threaded connection of neck 26 with pipe 10 provides a self-sealing supporting connection of part 22 with conduit 10. Neck portion 26 preferably extends into the interior of conduit 10 to a limited extent so that water may flow from conduit 10 through the tubular portion 26. Tubular part 26 merges with a central enlarged body portion 30 of the housing through which the bore 31 extends. A concentric coaxial tubular portion 32 projects from part 30 and is of slightly smaller diameter than the outer dimension of body portion 30 and is characterized by an enlarged bore 31 within whose innermost portion project shallow ribs 36 for a portion only of the length thereof so that the free or outermost end portion 38 of tubular part 32 has an uninterrupted bore or chamber defining portion. The enlarged body portion 30 preferably has a pair of opposed flat tool engaging outer surfaces 39. Housing part 22 includes a lateral projection 40 which is so shaped that a portion thereof cooperates with a portion of the tubular part 32 to define an arcuate groove 42. Body projection 40 terminates in an outer hook portion 44 of limited circumferential extent which preferably has an arcuate contour at 46, as best seen in FIGS. 3 and 4.

The housing part 24 is preferably formed of the same material as the part 22 and is of substantially cup-shaped configuration, having a tubular end portion 50 having a snug sliding fit on tubular part 32 of the housing part 22 to project into and seat in the groove 42 of part 22. The bore of tubular end part 50 is axially stepped and has a reduced concentric diameter at 52 and a second reduced concentric bore portion 54. The end portion 56 of housing part 24 at the end thereof opposite to tubular end portion 50 includes a reduced diameter bore portion 58 of inwardly tapered configuration to provide a circumferential shoulder 60 between bore parts 54 and 58 and substantially concentric therewith. In constructions in which housing part 24 is formed of plastic material, bore 58 is preferably lined with a stainless steel tapered tubular sleeve 62 having an outwardly projecting annular flange portion 64 which seats on shoulder 60.

Figure 6:
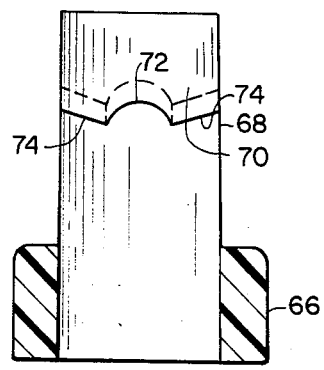
FIG. 6 is a fragmentary sectional view of a part of the housing of the device taken on line 6—6 of FIG. 4.
Figure 8:
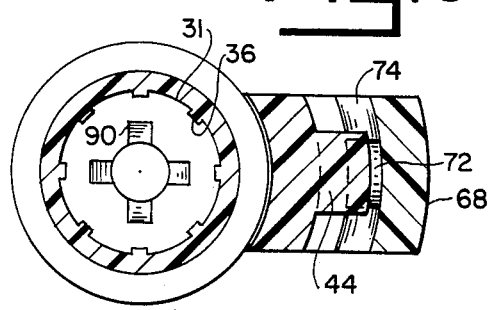
FIG. 8 is a sectional view taken along line 8—8 of FIG. 5.

Intermediate its length, the housing part 24 is provided with a lateral integral projection 66 from whose outer end extends a hook portion 68 with a return bent terminal lip portion 70. Lip 70 is engageable interiorally of hook portion 44 of housing 22 and is characterized by a configured end or lip surface as illustrated in FIG. 6 characterized by an arcuate inset central socket portion 72 and inclined ramp portions 74 at opposite ends of socket part 72.

The housing parts 22 and 24 interfit as best seen in FIG. 5 by sliding of tubular part 32 of part 22 in part 24 to telescoped position illustrated FIG. 5 while the hooks 68 and 44 are angularly or rotatively disposed. After housing parts 22 and 24 have been completely interfitted, they may then be relatively rotated to permit terminal portion 70 of the hook on part 24 to enter the groove interioraly of the hook portion 44 of the part 22. This relative rotation is characterized by progressive engagement of the leading inclined ramp surface 74 of the hook 68 upon the arcuate surface 46 of the hook portion 44 of the housing part 22 until such time as the central socket part 72 of the hook portion 70 seats upon the complementary hook surface 44 of the part 22. The hook portion 68 of the part 24 is sufficiently flexible or resilient and the slidable telescopic interfit of parts 22,24 accomodates the engagement of the complementary hook portions to interlocked relation in the assembly of the parts and to accommodate relative movement of the parts 22 and 24 from interlocked relation when the housing parts are to be separated.

A sealing seat member 80 is received within the cup-shaped housing part 24, being seated upon the shoulder provided by the inner flange 64 and the shoulder between the step bore portions 52 and 54. The sealing seat member is cup-shaped having a central reduced diameter bore to receive with clearance the stem 82 of a pin of a length to project from the end of the tubular member 62 when an enlarged head thereof 84 is seated within the cup-shaped sealing seat member 80. The sealing seat member 80 terminates in a thin marginal flange 86 which defines a part of a tapered or stepped interior of the free innermost end of the seat sealing member 80. The chamber defined within the ribbed tubular part 32 of the housing part 22 receives a ball valve member 88 of a size to fit with slight clearance within the part 32 for movement guided by the shallow ribs 36. The end of the head 84 of the pin 82 is provided with a concentric recess to receive a portion of the ball 88 in the normal sealed position of the parts of the valve as illustrated in FIG. 5.

An effective seal of the housing of the device 20 is provided by the snug fit of the tubular part 32 of part 22 within the tubular inner section 50 of the part 24 and by the seating of the ball valve member 88 upon the tapered or stepped inner end portion of the sealing seat member 80 in the normal position of the parts. The normal position of the parts is preferably as illustrated in FIG. 5 wherein the housing part 22 is uppermost and projects downwardly from the water supply conduit 10 so that the ball 88 will normally seat in sealing engagement with the sealing seat member 80. The arrangement of the parts is such that any movement of the pin 82 longitudinally thereof or to an inclined position relative to the housing will unseat the ball member 88 sufficiently to accommodate liquid flow past the ball to a limited extent as required to satisfy the thirst of the fowl or animal within the cage. The ball 88 is of sufficient weight to seat by gravity when displacement of the pin head 84 from normal seated position ends so as to effect resealing of the valve member. Element 26 includes slotted portions 90 adjacent the fluid inlet to prevent inadvertent closing of the inlet by the ball valve.

The housing parts 22 and 24 are formed of metal or plastic which will not rust or corrode incident to exposure to water in the watering system. The ball member 88, the seat member 80, the pin 82,84 and the lining tube 62,64 are preferably formed of rust resistant material such as stainless steel, or a rubber or resilient material in the case of the seat member 80. The operation of the valve member is characterized by a self-cleaning action incident to the flow of water through the device when the valve is open.

The installation of the watering device at any selected position relative to the tube 10 is accomplished by forming an aperture of approximately the diameter of the small terminal end of neck 26 in the conduit 10 at a selected position and screw threading the neck 26 of part 22 into the threaded bore to effect a seal.

Access to the interior of the two-part housing is readily accomplished by the rotation of part 24 relative to part 22 to disengage the cooperating hooks 44 and 70. Relative rotation of parts 22–24 is normally resisted by the seating of the socket portion 72 of the hook 70 upon the complementary surface of hook portion 44 of the member 22. However, intentional separation of the housing parts can be accomplished by relative rotation thereof should that become necessary for access to the interior parts of the device.

The operation of the valve by either endwise displacement or lateral tilting of the pin 82,84 from its normal sealing position illustrated in FIG. 5 is accomplished by even small or baby chicks or animals and the recessing at 85 of the ball engaging head 84 of the pin 84 accommodates opening of the valve to a slight extent upon a very small angular movement of the pin 82 from its normal sealing position.

While the preferred embodiment of the invention has been illustrated and described, it will be understood that the construction may be claimed within the scope of the appended claims without departing from the spirit of the invention.

We claim:

1. A watering device for poultry and small animals including a valve housing adapted to be connected to a fluid supply line and having an inlet, an outlet, a valve chamber, a valve seat means within said valve chamber, a valve member within said valve chamber engageable with said valve seat means to restrict fluid flow through said valve chamber, and a valve actuator operably associated with said valve member and including a portion thereof extending through said outlet, comprising:

said valve chamber being formed from first and second telescopically inter-fitting elements, said first telescopically interfitting element including said inlet and said second telescopically inter-fitting element including said outlet; and said first telescopically inter-fitting element including means for securing said watering device to said fluid supply line and being releaseably, interchangeably secured to said second telescopically inter-fitting element;

said valve member including a ball element and said valve chamber including interior ridges to guide said ball element, and said first telescopically inter-fitting element including slotted portions adjacent said inlet to prevent inadvertent closing of said inlet by said ball element;

said means for securing said watering device to said fluid supply line including a tapered, threaded tubular stem.

2. The watering device according to claim 1 wherein said first telescopically inter-fitting element sealingly engages said valve seat within said valve chamber so as to prevent fluid leakage between said first and said second telescopically inter-fitting elements.

3. The watering device according to claim 2 wherein said first telescopically inter-fitting element engages said valve seat so as to retain said valve seat against displacement within said valve chamber.

4. The watering device according to claim 2 wherein said first and said second telescopically inter-fitting elements are releasably secured together by means of mating hook arrangements on their respective surfaces exterior to said valve chamber.

* * * * *